United States Patent
Montemurro

(10) Patent No.: US 8,244,241 B2
(45) Date of Patent: Aug. 14, 2012

(54) WLAN NETWORK INFORMATION CACHING

(75) Inventor: Michael Montemurro, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 1206 days.

(21) Appl. No.: 11/876,455

(22) Filed: Oct. 22, 2007

(65) Prior Publication Data
US 2008/0096580 A1    Apr. 24, 2008

Related U.S. Application Data

(60) Provisional application No. 60/862,658, filed on Oct. 24, 2006.

(51) Int. Cl.
*H04W 4/00* (2009.01)

(52) U.S. Cl. ............. 455/434; 455/456.1; 455/435.2; 455/456.6; 370/338

(58) Field of Classification Search .......... 455/436.1, 455/434, 456.1, 435.2, 456.6; 370/338
See application file for complete search history.

(56) References Cited

U.S. PATENT DOCUMENTS

| | | | |
|---|---|---|---|
| 6,393,006 B1 * | 5/2002 | Kajihara ............... 370/335 |
| 7,164,920 B2 * | 1/2007 | Giacalone et al. ......... 455/455 |
| 7,275,165 B2 * | 9/2007 | Mehta et al. ............ 713/310 |
| 7,366,511 B2 * | 4/2008 | Jaakkola et al. ......... 455/435.2 |
| 2003/0118015 A1 * | 6/2003 | Gunnarsson et al. ...... 370/389 |
| 2004/0192328 A1 * | 9/2004 | Giacalone et al. ......... 455/455 |
| 2004/0259546 A1 | 12/2004 | Balachandran et al. |
| 2004/0266430 A1 | 12/2004 | Fudim et al. |
| 2005/0003835 A1 | 1/2005 | Riise et al. |
| 2005/0071476 A1 | 3/2005 | Tejaswini et al. |
| 2005/0091357 A1 | 4/2005 | Krantz et al. |
| 2005/0107097 A1 * | 5/2005 | Bahl et al. .............. 455/456.6 |
| 2005/0148332 A1 * | 7/2005 | Buckley et al. ............ 455/435.2 |
| 2005/0221844 A1 | 10/2005 | Trethewey et al. |
| 2005/0237967 A1 | 10/2005 | Lee et al. |
| 2006/0130097 A1 * | 6/2006 | Lee et al. ............... 725/50 |
| 2006/0142004 A1 | 6/2006 | He et al. |
| 2006/0148486 A1 | 7/2006 | Kim et al. |
| 2006/0280128 A1 * | 12/2006 | Abdel-Kader ......... 370/254 |
| 2007/0025293 A1 | 2/2007 | Choi |
| 2007/0073799 A1 * | 3/2007 | Adjali et al. ............ 709/200 |

(Continued)

FOREIGN PATENT DOCUMENTS

WO    WO-99/65270    12/1999
WO    WO-2006100653    9/2006

OTHER PUBLICATIONS

Hye-Soo, Kim et al., "Selective Channel Scanning for Fast Handoff in Wireless LAN using Neighbor Graph", Jul. 6, 2004.

(Continued)

*Primary Examiner* — Kamran Afshar
*Assistant Examiner* — Mong-Thuy Tran
(74) *Attorney, Agent, or Firm* — Integral Intellectual Property Inc.; Miriam Paton

(57) ABSTRACT

A WLAN client device maintains a history of profile-location associations. An association links a profile stored in the client device with a location in the vicinity of which the client device was connected to a wireless local area network matching the profile. While in a vicinity of a certain location, the client device may scan for wireless local area networks in a manner that takes into account records of the history that include the certain location.

21 Claims, 4 Drawing Sheets

U.S. PATENT DOCUMENTS

| | | | |
|---|---|---|---|
| 2007/0091861 A1* | 4/2007 | Gupta et al. | 370/338 |
| 2007/0223432 A1 | 9/2007 | Badarinath | |
| 2007/0230420 A1* | 10/2007 | Bumiller et al. | 370/338 |
| 2007/0249365 A1* | 10/2007 | Jendbro | 455/456.1 |
| 2008/0045234 A1* | 2/2008 | Reed | 455/456.1 |
| 2010/0232401 A1* | 9/2010 | Hirsch | 370/338 |

OTHER PUBLICATIONS

Straniero, Roberto, Third Exam Report for EP 07816036.3, Mar. 19, 2010.

Straniero, Roberto, Extended European Search Report for EP07816036.3, Sep. 14, 2009.

Savin, Daniela, Written Opinion of the International Searching Authority for PCT/CA2007/001886, Feb. 7, 2008.

Yi, Shuiying, First Office Action for CN 200780043389.6, Aug. 15, 2011.

Savin, Daniela, First Office Action for CA 2,666,967, Feb. 14, 2012.

Yl, Shuiying, Second Office Action for CN 200780043389.6, Mar. 16, 2012.

* cited by examiner

WLAN NETWORK INFORMATION CACHING

CROSS-REFERENCE TO RELATED APPLICATIONS

This application claims priority under 35 USC 119(e) from U.S. Provisional Patent Application No. 60/862,658, filed Oct. 24, 2006, and which is incorporated by reference herein.

BACKGROUND

A wireless local area network (WLAN) client device may store in its memory one or more profiles of wireless local area networks. A profile may include, for example, the service set identity (SSID) of the network, WLAN configuration parameters, security credentials, and Internet Protocol (IP) network parameters. The SSID is also known as the network name. The profiles may be assigned priorities, for example, by a user that has purchased the client device, a carrier who controls the sale of the client device, or an administrator of an enterprise that has purchased the client device.

Scanning is the process of identifying existing networks. Upon being operatively coupled to a radio of the client device, a WLAN controller of the client device may automatically initiate passive scanning. In passive scanning, the WLAN controller generally listens for beacon frames broadcast by access points (APs), one communication channel at a time. The communication channels, and the time spent passively scanning on a communication channel, are defined by the WLAN standard and/or regulatory requirements. Beacon frames of a WLAN are broadcast at regular intervals, for example, roughly each 100 ms. The SSIDs of the profiles stored in the client device are compared to the SSIDs included in beacon frames received by the client device on a particular communication channel. The order in which SSIDs of profiles are compared to the SSIDs of the scan results may be determined by one or more factors. For example, the SSIDs of the profiles may be compared in order of decreasing priority for the profiles. In another example, the SSIDs of the scan results may be compared in order of decreasing received signal strength. If the SSID field of a received beacon frame matches the SSID of a particular profile, the WLAN controller may initiate an authentication process and, if the authentication process is successful, may initiate an association or re-association process with the AP that sent the beacon frame.

If the comparison does not result in any matches, then the client device may present a list of identified networks (based on the SSID fields of any received beacon frames) to the user of the client device, so that the user can select which, if any, of the networks to join.

In active scanning, the WLAN controller transmits an active probe request including an SSID on a communication channel on which the regulatory requirements allow active probing. The WLAN controller may receive one or more probe responses. The probe responses may be received within 15 ms of the transmission of the active probe request. The active probe request may include a particular SSID, in which case probe responses will be received from APs in the vicinity that are hosting a WLAN having the particular SSID. Alternatively, the active probe request may include a "wild card" for an SSID and probe responses may be received from more than one network. In the latter case, the SSIDs of the profiles stored in the client device are compared to the SSIDs included in the probe responses. The order in which SSIDs of profiles are compared to the SSIDs of the scan results may be determined by one or more factors. For example, the SSIDs of the profiles may be compared in order of decreasing priority for the profiles. In another example, the SSIDs of the scan results may be compared in order of decreasing received signal strength. If the SSID included in a probe response matches the SSID of a particular profile, the WLAN controller may initiate an authentication process and, if the authentication process is successful, may initiate an association or re-association process with the AP that sent the probe response. If no probe responses are received, the client device may transmit the active probe request on a different communication channel, or may transmit an active probe request including a different SSID, or may put its radio into a sleep state.

A WLAN may have a suppressed SSID, in which case beacon frames for that WLAN will not include the suppressed SSID. Likewise, an AP having a suppressed SSID may ignore probe requests including a "wild card" SSID, or may respond with a probe response which lacks the SSID. If the client device stores one or more profiles having suppressed SSIDs, the client device may actively scan for those profiles using an active probe request including the suppressed SSID. An AP having a suppressed SSID will respond to such an active probe request with a probe response which includes the suppressed SSID, if the SSID of the network handled by the AP matches that in the active probe request.

For battery-operated client devices, the process of network discovery and association in a timely manner consumes significant battery life.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
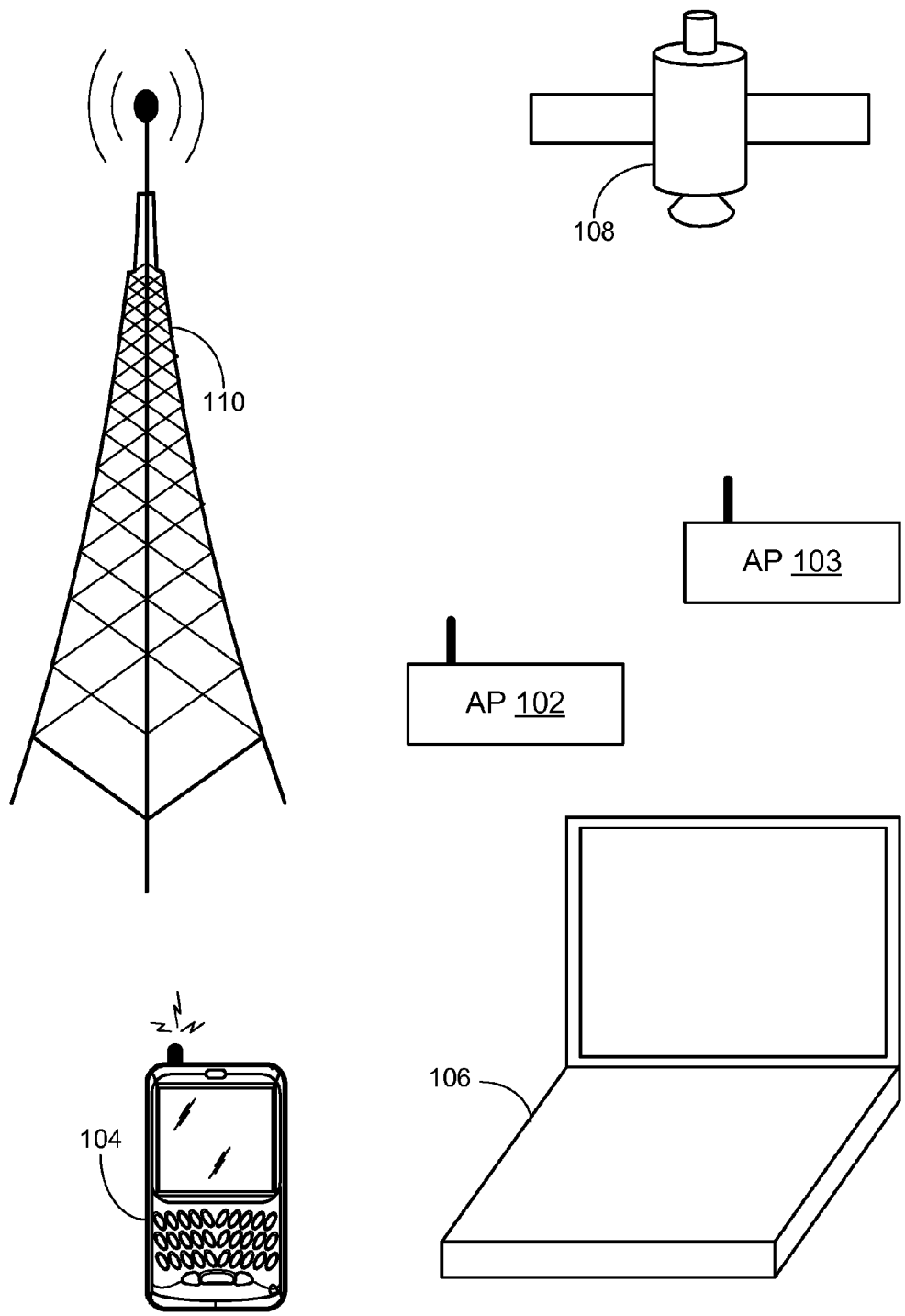
FIG. 1 is an illustration of various exemplary communication devices and systems.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

One or more profiles of wireless local area networks may be stored in a WLAN client device. The client device may maintain a history of profile-location associations. An association links a profile stored in the client device with a location in the vicinity of which the client device was connected to a wireless local area network described in the profile.

The association may also include an indication of the communication channel on which the client device connected to the wireless local area network. The association may also include an indication of a time at which the client device was connected to the wireless local area network.

For example, the history may includes records of one or more of the following formats:
location ID-profile name
location ID-profile name-channel ID
location ID-profile name-timestamp
location ID-profile name-channel ID-timestamp Any other suitable format that includes the information to be recorded is also contemplated.

The history may also be populated with profile-location associations, where the association links a profile stored in the client device with a location in the vicinity of which a wireless local area network described in the profile is known to exist, even if the client device has not yet connected to that wireless local area network. The association may also include an indication of the communication channel on which the wireless local area network is operating. These associations, or information from which these associations may be generated, may be sent to the client device via a wireless local area network or via any other wireless network over which the client device is able to communicate or via any other means, such as, a wired or optical connection between the client device and a computer. The source of these associations, or the information from which these associations may be generated, may be a database that stores data regarding access points, WLANs supported by the access points, known locations of the access points, channels used by the access points to support the WLANs, and the like.

The same profile may be associated with more than one location ID. For example, hotspots located at several different locations yet from the same carrier may all use the same SSID, hence a profile for that carrier's hotspots may be associated in the history with more than one location ID where the client device connected to the hotspots. Likewise, the same location ID may be associated with more than one profile in the history. This may occur, for example, if more than one WLAN is available at the same location, profiles for at least two of the WLANs are stored in the client device, and the client device has previously connected to the at least two WLANs.

While in the vicinity of a certain location, the client device may scan for wireless local area networks in a manner that takes into account records of the client device's history that include the certain location.

For example, if the client device performs active scanning on a profile-by-profile basis, in which a probe request includes the SSID of a profile stored in the client device, then the client device may send probe requests for those profiles associated in the history with the certain location and may refrain from sending probe requests with the SSIDs of profiles that are not associated in the history with the certain location. By refraining from sending certain probe requests, active scanning in this manner may involve less power consumption than active scanning in which probe requests for all profiles stored in the client device are sent. However, if a wireless local area network in the vicinity of the certain location has an SSID that is not in a profile associated in the history with the certain location, the wireless local area network will not be detected by this manner of active scanning.

In another example, if the client device performs active scanning on a profile-by-profile basis, in which a probe request includes the SSID of a profile stored in the client device, then the client device may send probe requests for those profiles associated in the history with the certain location prior to sending probe requests with the SSIDs of profiles that are not associated in the history with the certain location. Since the SSIDs of profiles associated in the history with the certain location are sought prior to the SSIDs of profiles that are not associated in the history with the certain location, networks may be detected faster than if the SSIDs of the profiles were scanned in an order that doesn't take into account which profiles describe wireless local area networks that the client device previously connected to in the vicinity of the certain location.

In yet another example, the client device may place all or a portion of its WLAN communication interface (which includes its WLAN radio) into a lower power state when not in the vicinity of a location included in the client device's history, so that scanning is not performed by the client device when not in the vicinity of a location included in the client device's history, and may place its WLAN communication interface in a higher power state sufficient for scanning when in the vicinity of a location that is included in the client device's history. In this example, scanning is performed only when there is an expectation, based on the history, that a WLAN matching one of the profiles in the client device will be detected. This may reduce the power consumption of the client device, since scanning is not performed in locations where there is no expectation of detecting a WLAN matching one of the profiles stored in the client device. For example, if the client device stores a first profile for a WLAN at the home of the user of the client device and stores a second profile for a WLAN at the workplace of the user of the client device, and each of these profiles is associated in the history with the corresponding location, then when the user travels with the client device between home and the workplace, no scanning will be done. As the user approaches or arrives at home or the workplace, scanning will be performed and the WLAN, if active, will be detected.

In a further example, where the association includes an indication of the communication channel on which the client device connected to the wireless local area network, the client device may scan for wireless local area networks on channels associated in the history with the certain location and may refrain from scanning for wireless local area networks on channels that are not associated in the history with the certain location. This may apply to passive scanning, active scanning or any combination thereof. By refraining from scanning on certain channels, this manner of scanning may involve less power consumption than scanning on all channels. However, if a wireless local area network in the vicinity of the certain location is on a channel that is not in a profile associated in the history with the certain location, the wireless local area network will not be detected by this manner of scanning. The effect of this manner of scanning may be greater in networks having many channels, such as IEEE 802.11a, than in networks having fewer channels, such as IEEE 802.11b or IEEE 802.11g.

In another example, where the association includes an indication of the communication channel on which the client device connected to the wireless local area network, the client device may scan for wireless local area networks on channels associated in the history with the certain location prior to scanning for wireless local area networks on channels that are not associated in the history with the certain location. This may apply to passive scanning, active scanning or any combination thereof. Since the channels associated in the history with the certain location are scanned prior to the channels that are not associated in the history with the certain location, networks may be detected faster than if the channels were scanned in an order that doesn't take into account on which channels the client device previously connected to wireless local area networks when in the vicinity of the certain location.

The client device may employ any combination of the modifications described hereinabove.

The client device may determine its current location using any suitable method. The current location as determined by the client device need not be precise. It may be sufficient that the location thus determined be distinguishable from other locations identified in the history.

For example, the client device may be equipped with or coupled to a global positioning system (GPS) receiver and able to obtain its GPS coordinates from received signals that originate from a system of GPS satellites. The location ID in the history may be related to the GPS coordinates. Using information that is included in signals received via the GPS receiver, the GPS receiver or a processor of the client device or both may be able to estimate the geographic location of the client device. The accuracy of location estimation using GPS is subject to errors due to Ionospheric effects, Ephemeris errors, Satellite clock errors, Multipath distortion, Tropospheric effects, Numerical errors and other errors, and may be in the range of approximately 2 meters to 20 meters.

In another example, the client device may be able to communicate with a base station of a cellular network system and to determine its location from those communications. A non-exhaustive list of methods for estimating the location of a cellular device from signals received via a cellular network interface includes RSS (received signal strength) positioning, E-OTD (Enhanced Observed Time Difference), TOA (time of arrival) positioning, U-TDOA (Uplink Time Difference of Arrival), WLS (Wireless Location Signature), A-GPS (assisted GPS), ALFT, ELFT, Radio Fingerprinting, AOA (Angle of Arrival) positioning, MNLS, CGI (Cell Global Identity), CGI+Timing Advance, Enhanced Cell ID, and any other appropriate method. With U-TDOA, for example, latitude and longitude can be typically calculated with an accuracy of about 50 meters. A simpler version may be for the client device to use the location of the cellular base station as the location ID in the history. Alternatively, the client device may use the cell id gleaned from signals received from the cellular base station as an indication of its current location. Similar techniques may be applied in the case where the client device has a wireless network interface that is compatible with one or more wide area network communication standards, such as IEEE 802.16, WiMAX and Broadband Wireless Access (BWA).

FIG. 1 illustrates various exemplary communication devices and systems. An AP 102 may belong to a first WLAN and an AP 103 may belong to a second WLAN. WLAN client devices, for example, a handheld device 104 and a laptop computer 106, may search for and attempt to connect to wireless local area networks.

Profiles of wireless local area networks may be stored in the WLAN client devices. For example, laptop computer 106 may store profiles of a work WLAN, a home WLAN, a hotspot and a hotel WLAN. In another example, handheld device 104 may store profiles of a work WLAN, a home WLAN and two hotspots that its user frequents.

Handheld device 104 or laptop computer 106 or both may be coupled to or equipped with a GPS receiver and may be able to determine their locations from signals received from GPS satellites, of which a single satellite 108 is shown.

Handheld device 104 or laptop computer 106 or both may have a wireless network interface and may be able to determine its location from signals received from a base station 110.

Figure 2:
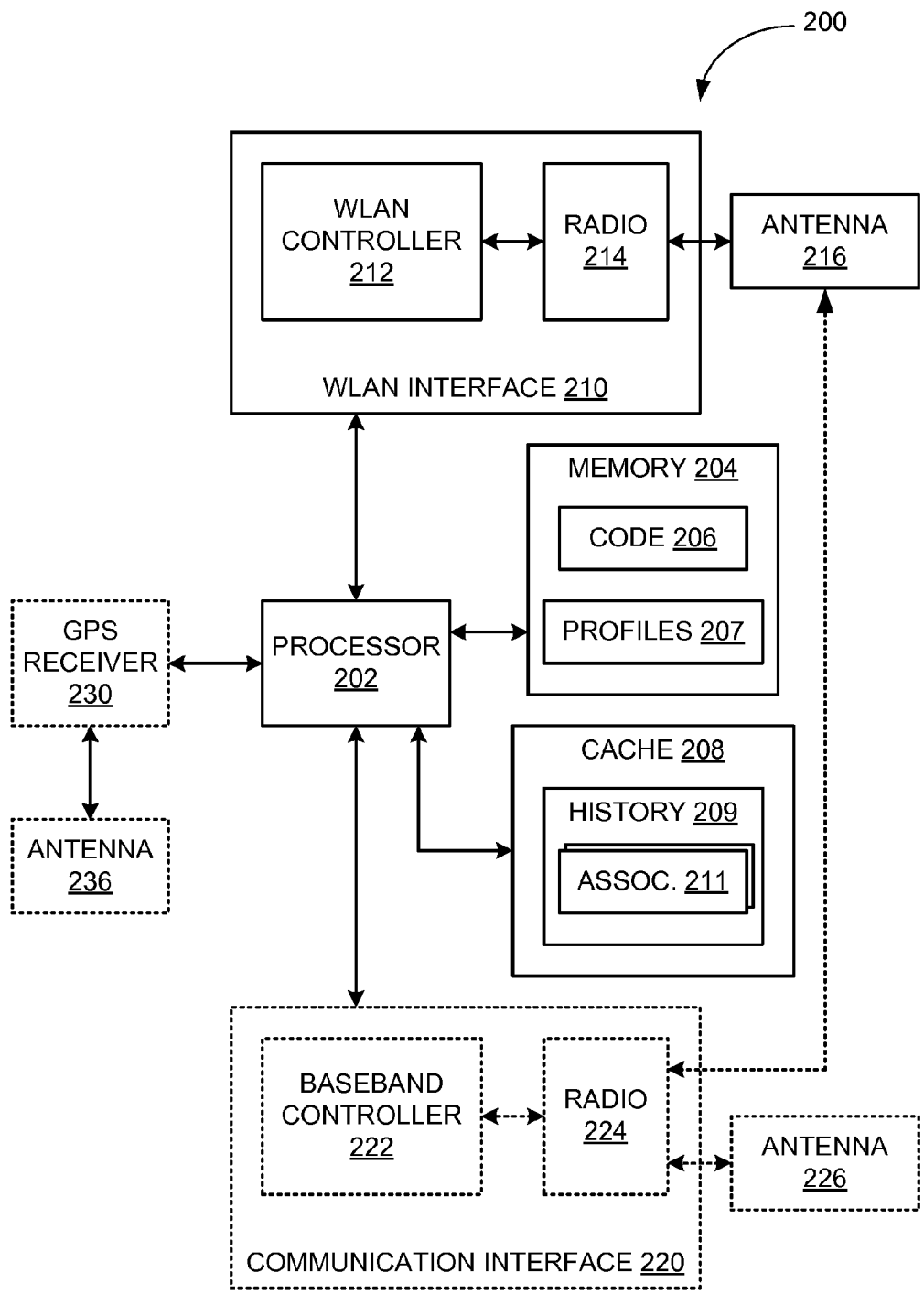
FIG. 2 is a block diagram of an exemplary client device.

FIG. 2 is a block diagram of an exemplary client device. A client device 200 comprises a processor 202, and a memory 204 coupled to processor 202. A cache 208 may also be coupled to or embedded in processor 202. A history 209 of associations 211 may be stored in cache 208 for rapid access or may be stored in memory 204.

Client device 200 comprises a WLAN interface 210, compatible with one or more WLAN standards, for example, one or more standards of the family of IEEE 802.11 wireless communication standards. WLAN interface 210 is coupled to processor 202 and includes at least a WLAN controller 212 and a radio 214. Client device 200 also comprises an antenna 216 coupled to radio 214. For example, client device 200 may be able to communicate with APs via WLAN interface 210 and antenna 216.

Memory 204 stores code 206 that, when executed by processor 202, may implement the methods described herein together with WLAN controller 212. Memory 204 also stores profiles 207 of wireless local area networks.

Client device 200 may also comprise a wireless communication interface 220. Wireless communication interface 220 may be a wireless cellular network communication interface. Wireless communication interface 220 is coupled to processor 202 and includes at least a baseband controller 222 and a radio 224. Radio 224 may be coupled to antenna 216, or client device 200 may comprise an additional antenna 226 coupled to radio 224. Client device 200 may be able to communicate with base stations of a cellular network via wireless communication interface 220 and antenna 216 or 226. Alternatively, wireless communication interface 220 may be a wide area network communication interface.

Client device 200 may also comprise a GPS receiver 230 coupled to processor 202, and an antenna 236 coupled to GPS receiver. GPS receiver 230 may be considered a wireless interface.

Client device 200 includes other components that, for clarity, are not shown in FIG. 2. A non-exhaustive list of examples for client device 200 includes a wireless-enabled laptop computer, a wireless-enabled tablet computer, a wireless-enabled cellphone, a wireless-enabled personal digital assistant (PDA), a wireless-enabled smart phone, a wireless-enabled video camera/monitor, a wireless-enabled gaming/multimedia console, a wireless-enabled sensor/reporting/storage device, a wireless Internet Protocol (IP) phone and any other suitable WLAN client device.

Figure 3:
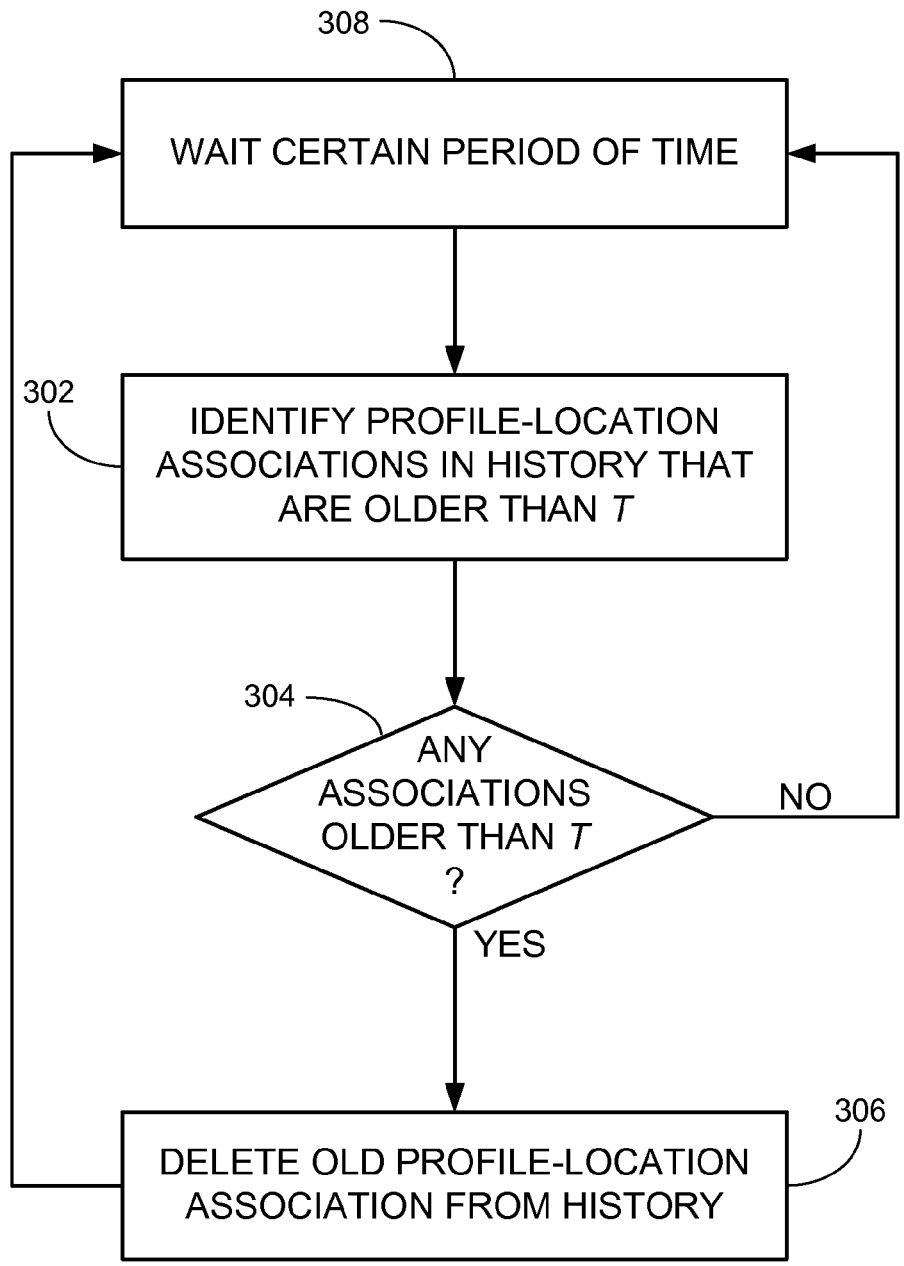
FIG. 3 is a flowchart of an exemplary method for pruning a history of profile-location associations.

FIG. 3 is a flowchart of an exemplary method for pruning the history of aged associations. At 302, the client device identifies which, if any, profile-location associations in the history have a timestamp that indicates that the association is older than a time T. The time T may be configurable by the client device. If there are any associations older than T, as checked at 304, then at 306, those associations may be deleted. After waiting a certain period of time, as indicated at 308, the method may resume from 302.

Figure 4:
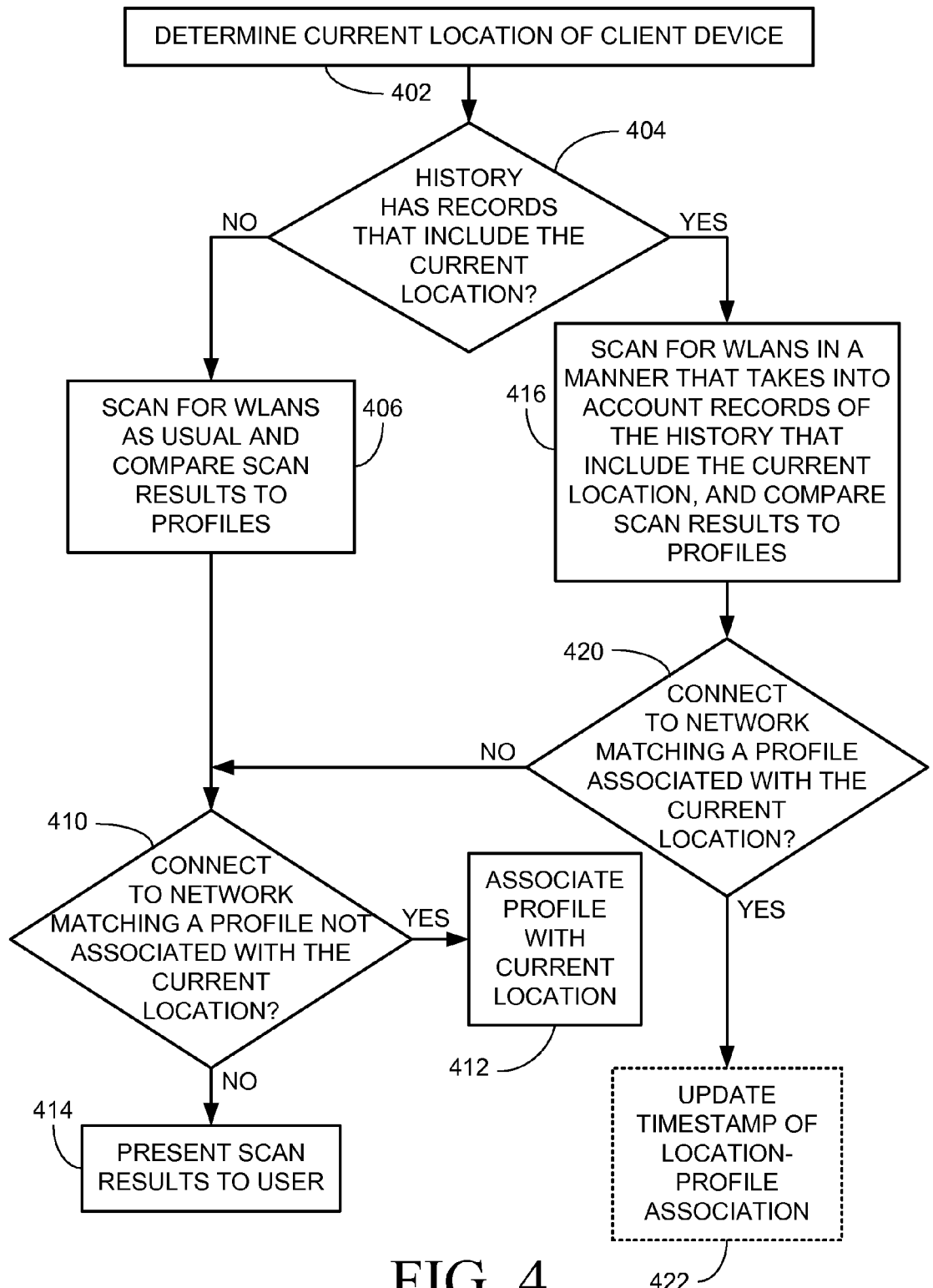
FIG. 4 is a flowchart of an exemplary scanning scheme.

FIG. 4 is a flowchart of an exemplary scanning scheme to be implemented in a client device, for example, handheld device 104 or laptop 106.

At 402, the client device determines its current location. Various methods for the client device to determine its current location have been described hereinabove.

At 404, the client device checks whether the history has records that include the current location.

If not, then at 406, the client device scans for WLANs as usual and compares the scan results to the one or more profiles stored in the client device. The scanning may be passive or active or involve a combination of the two types. Any suitable scanning algorithm may be used at 406. Any suitable method for comparing the scan results and the profiles may be used at 406.

If there is a match, and the client device connects to a WLAN matching one of the profiles, as checked at 410, then an association of the particular profile and the current location may be included in the history at 412. The association may also include a timestamp. The association may also include an indication of the communication channel on which the client device connected to the WLAN. If there are no matches or an attempted connection does not succeed, the client device may present the scan results to the user at 414.

Returning to 404, if the history has records that include the current location, then at 416, the client device scans for WLANs in a manner that takes into account records of the history that include the current location, and compares the scan results to the one or more profiles stored in the client device. Examples of how the scan may take into account records of the history have been described hereinabove. Any suitable method for comparing the scan results and the profiles may be used at 416.

If there is a match, and the client device connects to a WLAN matching one of the profiles associated in the history with the current location, as checked at 420, then the timestamp, if any, of the corresponding profile-location association in the history may be updated at 422. Otherwise, the method may proceed to 410 where the client device checks whether client device has connected to a WLAN matching a profile that is not associated in the history with the current location.

Although the subject matter has been described in language specific to structural features or methodological acts or both, it is to be understood that the subject matter defined in the appended claims is not necessarily limited to the specific features or acts described above. Rather, the specific features and acts described above are disclosed as example forms of implementing the claims.

What is claimed is:

1. A method in a wireless local area network client device, the method comprising:
    maintaining a history of profile-location associations, where an association links a profile stored in the client device with a location in a vicinity of which the client device was connected to a wireless local area network described in the profile and where the association includes an indication of a time at which the client device was connected to the wireless local area network when in the vicinity of the location;
    determining a current location of the client device; and
    while in a vicinity of the current location, actively scanning for wireless local area networks by sending probe requests that include service set identifiers of profiles that are associated in the history with the current location prior to sending probe requests that include service set identifiers of profiles that are stored in the client device but are not associated in the history with the current location.

2. The method of claim 1, wherein maintaining the history further comprises:
    removing from the history associations that are older than a certain age.

3. The method of claim 2, further comprising:
    configuring the certain age.

4. The method of claim 1, wherein maintaining the history further comprises:
    updating the time indicated in the association if the client device is subsequently connected to the wireless local area network when in the vicinity of the location.

5. A method in a wireless local area network client device, the method comprising:
    maintaining a history of profile-location associations, where an association links a profile stored in the client device with a location in a vicinity of which the client device was connected to a wireless local area network described in the profile and where the association includes an indication of a time at which the client device was connected to the wireless local area network when in the vicinity of the location;
    determining a current location of the client device; and
    while in a vicinity of the current location, refraining from scanning for wireless local area networks when the history does not have any records that include the current location.

6. The method of claim 5, wherein maintaining the history further comprises:
    removing from the history associations that are older than a certain age.

7. The method of claim 6, further comprising:
    configuring the certain age.

8. The method of claim 5, wherein maintaining the history further comprises:
    updating the time indicated in the association if the client device is subsequently connected to the wireless local area network when in the vicinity of the location.

9. A method in a wireless local area network client device, the method comprising:
    maintaining a history of profile-location associations, where an association links a profile stored in the client device with a location in a vicinity of which the client device was connected to a wireless local area network described in the profile, where the association includes an indication of the communication channel on which the client device detected the wireless local area network when in the vicinity of the location and where the association includes an indication of a time at which the client device was connected to the wireless local area network when in the vicinity of the location;
    determining a current location of the client device; and
    while in a vicinity of the current location, scanning for wireless local area networks on one or more of the communication channels indicated in associations that identify the current location prior to scanning on communication channels that are not associated in the history with the current location.

10. The method of claim 9, wherein maintaining the history further comprises:
    removing from the history associations that are older than a certain age.

11. The method of claim 10, further comprising:
    configuring the certain age.

12. The method of claim 9, wherein maintaining the history further comprises:
    updating the time indicated in the association if the client device is subsequently connected to the wireless local area network when in the vicinity of the location.

13. A wireless client device comprising:
    a processor;
    a wireless local area network interface coupled to the processor, the wireless local area network interface comprising a wireless local area network controller and a radio;
    an antenna coupled to the radio;
    another wireless interface coupled to the processor, through which the client device is able to determine its current location; and
    a memory coupled to the processor, the memory arranged to store profiles of wireless local area networks and arranged to store executable code that, when executed by the processor, maintains a history of profile-location associations, where an association links a profile stored in the client device with a location in a vicinity of which the client device was connected to a wireless local area network described in the profile and where the association includes an indication of a time at which the client device was connected to the wireless local area network when in the vicinity of the location, and, while in a vicinity of the current location, controls the wireless local area network controller to actively scan for wireless local area networks by sending probe requests that include service set identifiers of profiles that are associated in the history with the current location prior to sending probe requests that include service set identifiers of profiles that are stored in the client device but are not associated in the history with the current location.

14. The wireless client device of claim 13, wherein the memory is arranged to store the history of associations.

15. The wireless client device of claim 13, further comprising:
a cache coupled to the processor, the cache arranged to store the history of associations.

16. The wireless client device of claim 13, wherein the other wireless interface comprises a global positioning system (GPS) receiver.

17. The wireless client device of claim 13, wherein the other wireless interface comprises a wireless cellular network communication interface.

18. The wireless client device of claim 13, wherein the other wireless interface comprises a wireless wide area network communication interface.

19. The wireless client device of claim 13, wherein the executable code, when executed by the processor, removes from the history associations those are older than a certain age.

20. The wireless client device of claim 19, wherein the certain age is configurable.

21. The wireless client device of claim 13, wherein the executable code, when executed by the processor, updates the time indicated in the association if the client device is subsequently connected to the wireless local area network when in the vicinity of the location.

* * * * *

UNITED STATES PATENT AND TRADEMARK OFFICE
CERTIFICATE OF CORRECTION

PATENT NO. : 8,244,241 B2
APPLICATION NO. : 11/876455
DATED : August 14, 2012
INVENTOR(S) : Michael Peter Montemurro Page 1 of 1

It is certified that error appears in the above-identified patent and that said Letters Patent is hereby corrected as shown below:

Col. 10, Line 3 of claim 19 should read "from the history associations that are older than a certain".

Signed and Sealed this
Sixteenth Day of October, 2012

David J. Kappos
*Director of the United States Patent and Trademark Office*